United States Patent
Hwang

(10) Patent No.: US 9,042,566 B2
(45) Date of Patent: May 26, 2015

(54) WIDEBAND ACOUSTIC ECHO CANCELLATION APPARATUS WITH ADAPTIVE TAIL LENGTH IN EMBEDDED SYSTEM, AND WIDEBAND ACOUSTIC ECHO CANCELLATION METHOD

(71) Applicant: Electronics and Telecommunications Research Institute, Daejeon (KR)

(72) Inventor: In Ki Hwang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 343 days.

(21) Appl. No.: 13/722,051

(22) Filed: Dec. 20, 2012

(65) Prior Publication Data
US 2013/0156211 A1   Jun. 20, 2013

(30) Foreign Application Priority Data
Dec. 20, 2011   (KR) ........................ 10-2011-0138155

(51) Int. Cl.
*H04B 3/20*   (2006.01)
*H04B 3/23*   (2006.01)
*H04M 9/08*   (2006.01)

(52) U.S. Cl.
CPC *H04B 3/23* (2013.01); *H04M 9/082* (2013.01)

(58) Field of Classification Search
CPC ................................ H04M 9/082; H04B 3/23
USPC ....................................... 381/66; 379/406.01
See application file for complete search history.

(56) References Cited

U.S. PATENT DOCUMENTS

| 5,537,443 A * | 7/1996 | Yoshino et al. ............... 375/340 |
| 5,548,286 A * | 8/1996 | Craven .......................... 341/126 |
| 2003/0235295 A1 * | 12/2003 | He et al. ................... 379/406.01 |

FOREIGN PATENT DOCUMENTS

KR   10-0524341   10/2005

* cited by examiner

*Primary Examiner* — Simon King
(74) *Attorney, Agent, or Firm* — Nelson Mullins Riley & Scarborough LLP; Anthony A. Laurentano, Esq.

(57) ABSTRACT

A wideband acoustic echo cancellation apparatus with an adaptive tail length in an embedded system, and a wideband acoustic echo cancellation method are provided, and the wideband acoustic echo cancellation apparatus may include a delay length calculating unit to calculate a delay length of an echo path, using a near-end signal and a far-end signal, an adaptive filter implementing unit to implement an adaptive filter based on the calculated delay length, using selected coefficients, and an error calculating unit to search for three intervals having a largest impulse response value from all intervals of a tail of the adaptive filter, and to calculate an error during an interval in which the selected coefficients are used.

10 Claims, 4 Drawing Sheets

WIDEBAND ACOUSTIC ECHO CANCELLATION APPARATUS WITH ADAPTIVE TAIL LENGTH IN EMBEDDED SYSTEM, AND WIDEBAND ACOUSTIC ECHO CANCELLATION METHOD

CROSS-REFERENCE TO RELATED APPLICATION

This application claims the benefit of Korean Patent Application No. 10-2011-0138155, filed on Dec. 20, 2011, in the Korean Intellectual Property Office, the disclosure of which is incorporated herein by reference.

BACKGROUND

1. Field of the Invention

The present invention relates to a wideband acoustic echo cancellation apparatus with an adaptive tail length in an embedded system, and a wideband acoustic echo cancellation method, and more particular, to a technology of cancelling an acoustic echo that is input to a microphone via various paths and transferred to a far-positioned speaker.

2. Description of the Related Art

An acoustic echo may arise when a sound signal output through a speaker in a terminal is input to a microphone via various paths and is transferred to a far-positioned speaker. An acoustic echo cancellation apparatus refers to an apparatus for cancelling the acoustic echo.

To cancel the acoustic echo, various methods using time space and frequency space may be used. The various methods have been improved to satisfy criteria, for example a convergence time to lower the acoustic echo below a predetermined level, a long echo path processing ability, a simultaneous call detection time, a calculation amount, and the like.

In general, a long echo path, namely one of performance indexes of the acoustic echo, may be used as a criterion for estimating an echo environment coefficient by storing an input signal in a memory for a long time period M.

A number of taps of an adaptive filter may also be operated based on the time period M. The adaptive filter may mainly perform filtering of an adaptive filter coefficient that may be defined to be an echo similar to a reference far-end signal, may perform calculation of a difference between a near-end signal and similar echoes that may be defined to be errors, and may perform updating of the adaptive filter coefficient.

The above operations may be performed by arithmetic operations, such as multiplication and addition. Accordingly, as a number of coefficients increases, a processing apparatus with a higher performance may be required. Therefore, a large number of researches have been conducted to reduce a number of coefficients of a filter.

To remove the acoustic echo using the adaptive filter, an energy of an input far-end signal may be calculated, a far-end signal set used as a criterion may be multiplied by a current adaptive filter coefficient set, addition (filtering) may be performed, and a similar echo value may be obtained. As a result of subtracting similar echo signals from the near-end signal, that is, an operation of dividing an error value by a far-end signal energy, of multiplying a far-end signal set, of multiplying a filter step coefficient 'mu', of adding a previous adaptive filter coefficient value, and of updating a coefficient value of the adaptive filter may be repeatedly performed.

A length of a tail that is generally required in a typical acoustic echo cancellation apparatus may be 128 milliseconds (msec), and may be converted to a number of samples, namely, 2048 samples obtained by '128*10$^{-3}$*wideband sampling frequency (16 KHz)'.

In other words, the time period M may have a value of '2048'. However, complexity of an operation of the adaptive filter may further increase, as the value of the time period M increases.

SUMMARY

According to an aspect of the present invention, there is provided a wideband acoustic echo cancellation apparatus, including: a delay length calculating unit to calculate a delay length of an echo path, using a near-end signal and a far-end signal; an adaptive filter implementing unit to implement an adaptive filter based on the calculated delay length, using selected coefficients; and an error calculating unit to search for three intervals having a largest impulse response value from all intervals of a tail of the adaptive filter, and to calculate an error during an interval in which the selected coefficients are used.

According to another aspect of the present invention, there is provided a wideband acoustic echo cancellation method, including: calculating a delay length of an echo path, using a near-end signal and a far-end signal; implementing an adaptive filter based on the calculated delay length, using selected coefficients; searching for three intervals having a largest impulse response value from all intervals of a tail of the adaptive filter; calculating an error in the three intervals during an interval in which the selected coefficients are used; verifying an influence of a result of an operation of the three intervals on a ratio of an energy of the near-end signal and a signal energy of the error, when the adaptive filter reaches a convergence; and storing a corresponding adaptive filter coefficient in an internal memory, and disabling an operation of the adaptive filter, when the verified influence is equal to or less than a threshold.

EFFECT

According to an embodiment of the present invention, it is possible to adaptively change a length of a tail, to implement a wideband acoustic echo cancellation apparatus in an embedded system.

Additionally, according to an embodiment of the present invention, it is possible to reduce used resources while minimizing a change in a ratio of a near-end signal energy to an error signal energy, by adaptively changing a length of a tail, and thus it is possible to reduce an amount of power to be consumed.

Furthermore, according to an embodiment of the present invention, it is possible to actively determine a length of a tail based on a result of a monitoring module that estimates an environment enabling change of the length of the tail.

Moreover, according to an embodiment of the present invention, it is possible to adaptively change a number of samples of a far-end signal used as a reference signal to estimate an echo environment coefficient, in a structure in which an acoustic echo is cancelled using an adaptive filter in time and space.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
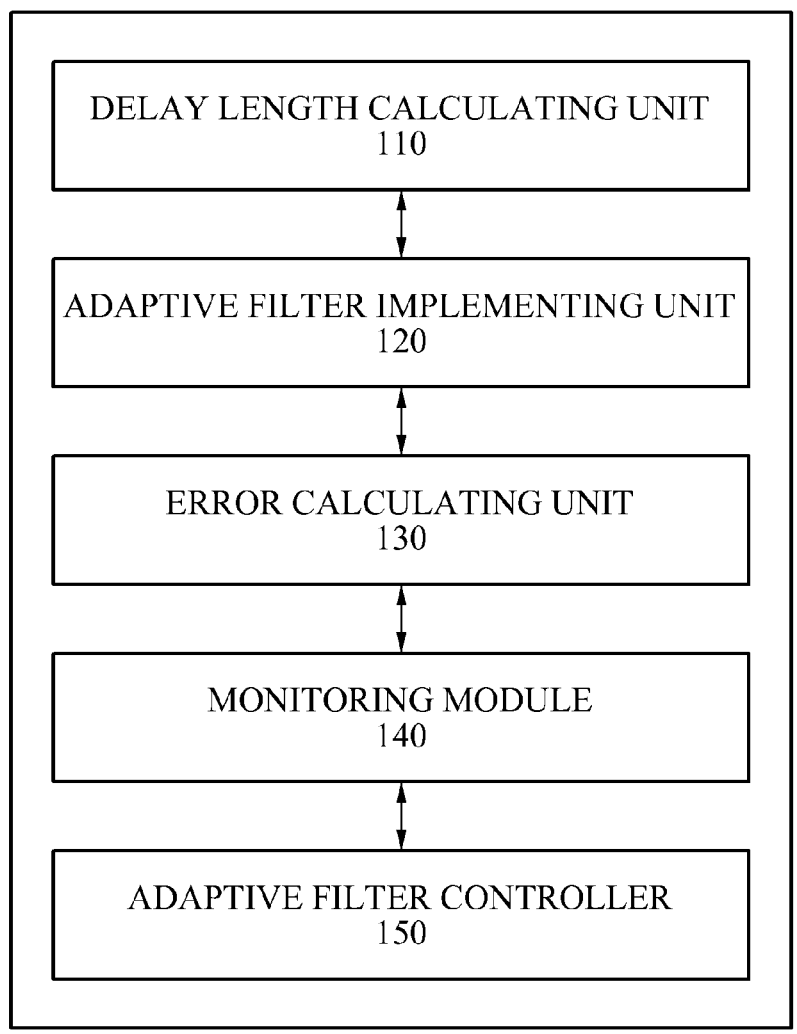
FIG. 1 is a block diagram illustrating a wideband acoustic echo cancellation apparatus according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a block diagram illustrating a wideband acoustic echo cancellation apparatus 100 according to an embodiment of the present invention.

To implement the wideband acoustic echo cancellation apparatus 100 in an embedded system, a length of a tail may be adaptively changed.

In the wideband acoustic echo cancellation apparatus 100, a delay length of an echo path may be calculated using a near-end signal and a far-end signal, and an adaptive filter may be implemented based on the calculated delay length, using 128 coefficients. Subsequently, three intervals having a largest impulse response value may be searched for 2048 intervals of a tail of the adaptive filter, and an error may be calculated during an interval in which 128 coefficients are used. By using such a scheme, the wideband acoustic echo cancellation apparatus 100 may reduce a number of filter coefficients from 2048 to 512 that is obtained by multiplying 128 by 4.

As shown in FIG. 1, the wideband acoustic echo cancellation apparatus 100 may include a delay length calculating unit 110, an adaptive filter implementing unit 120, an error calculating unit 130, a monitoring module 140, and an adaptive filter controller 150.

The delay length calculating unit 110 may calculate a delay length of an echo path, using a near-end signal and a far-end signal.

The adaptive filter implementing unit 120 may implement an adaptive filter based on the calculated delay length, using selected coefficients, for example 128 coefficients.

The error calculating unit 130 may search for three intervals having a largest impulse response value from all intervals of a tail of the adaptive filter, and may calculate an error during an interval in which the selected coefficients are used.

Specifically, the error calculating unit 130 may search for three intervals having the largest impulse response value from 2048 intervals, and may calculate an error during an interval in which 128 coefficients are used.

Accordingly, a number of filter coefficients may be reduced from 2048 to 512 that is obtained by multiplying 128 by 4.

The monitoring module 140 may estimate a condition to change a length of the tail. The adaptive filter controller 150 may change the length of the tail, based on the estimated condition.

The monitoring module 140 may apply a structure in which the length of the tail is reduced to an unexpected change in an echo environment.

When a performance index is equal to or greater than a performance threshold, the monitoring module 140 may track a coefficient value of a main adaptive filter of one frame (80 samples:5 msec).

The monitoring module 140 may accumulate an amount of the coefficient value changed during one frame, and may compare an accumulated value with a monitoring threshold.

When the amount of the coefficient value is greater than the monitoring threshold, the echo environment may be determined to be changed.

Accordingly, the monitoring module 140 may restore the length of the tail to the original state, and may prevent the adaptive filter from diverging by the changed echo environment.

According to another embodiment of the present invention, when the adaptive filter reaches a convergence, the adaptive filter controller 150 may verify an influence of a result of an operation of the three intervals on a ratio of an energy of the near-end signal and a signal energy of the error. When the verified influence is equal to or less than a threshold, the adaptive filter controller 150 may store a corresponding adaptive filter coefficient in an internal memory, and may disable an operation of the adaptive filter.

According to still another embodiment of the present invention, the adaptive filter controller 150 may determine whether a length of a reference far-end signal that is currently used is equal to or less than a length of a tail that is set initially, based on position information of the adaptive filter.

In this instance, when the length of the reference far-end signal is equal to or less than the length of the tail, the adaptive filter controller 150 may determine the length of the tail to be a sum of a delay time, an adaptive filter coefficient, a position of a used sub-band, and a filter coefficient of the sub-band.

In other words, when the adaptive filter reaches a convergence, and when the result of the operation of the found three intervals does not significantly affect the ratio of the energy of the near-end signal and the signal energy of the error, the adaptive filter controller 150 may store a corresponding adaptive filter coefficient in an internal memory, and may disable an operation of each adaptive filter.

Additionally, when a length of a reference far-end signal that is currently used is determined to be less than '2048', namely a length of a tail that is set initially, based on position information of a corresponding adaptive filter, the adaptive filter controller 150 may determine the length of the tail to be a sum of a delay time, an adaptive filter coefficient (for example, 128 coefficients), a position of a used sub-band, and a filter coefficient of the sub-band (for example, 128 coefficients).

In other words, when all sub-bands are not used, the adaptive filter controller 150 may determine the length of the tail to be a sum of the delay time and '128'.

Figure 2:
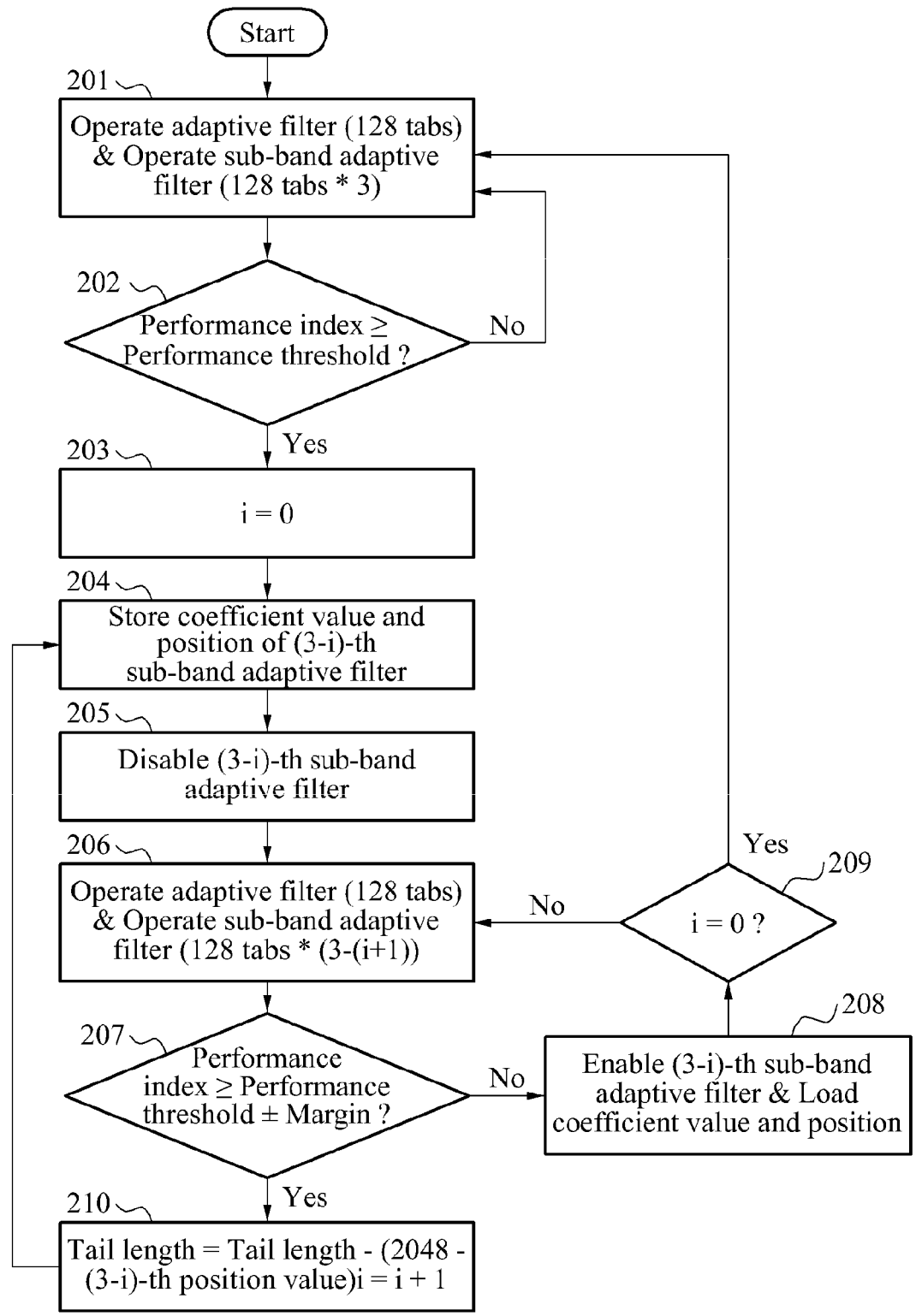
FIGS. 2 through 4 are flowcharts illustrating a wideband acoustic echo cancellation method according to an embodiment of the present invention.
Figure 3:
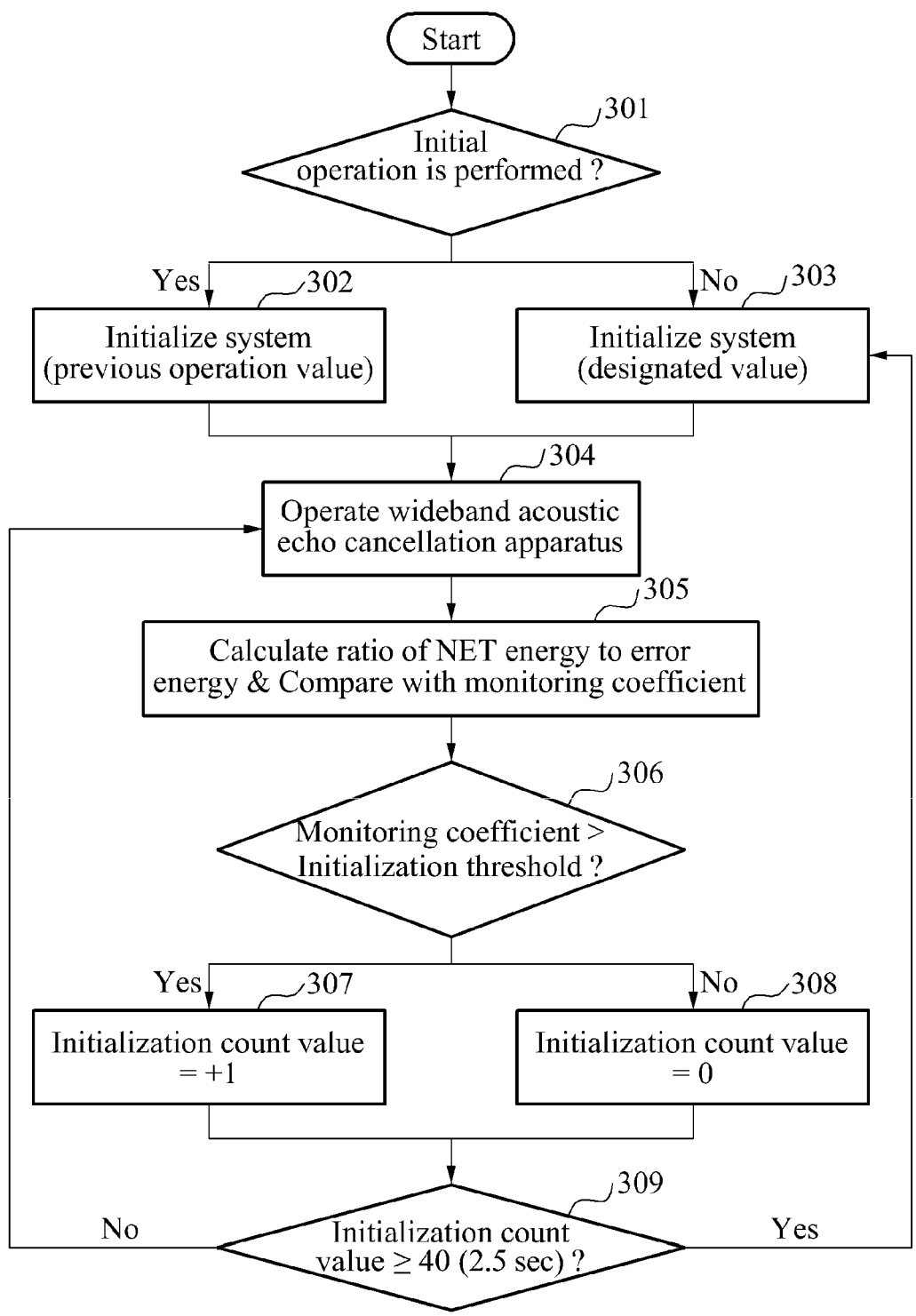
Figure 4:
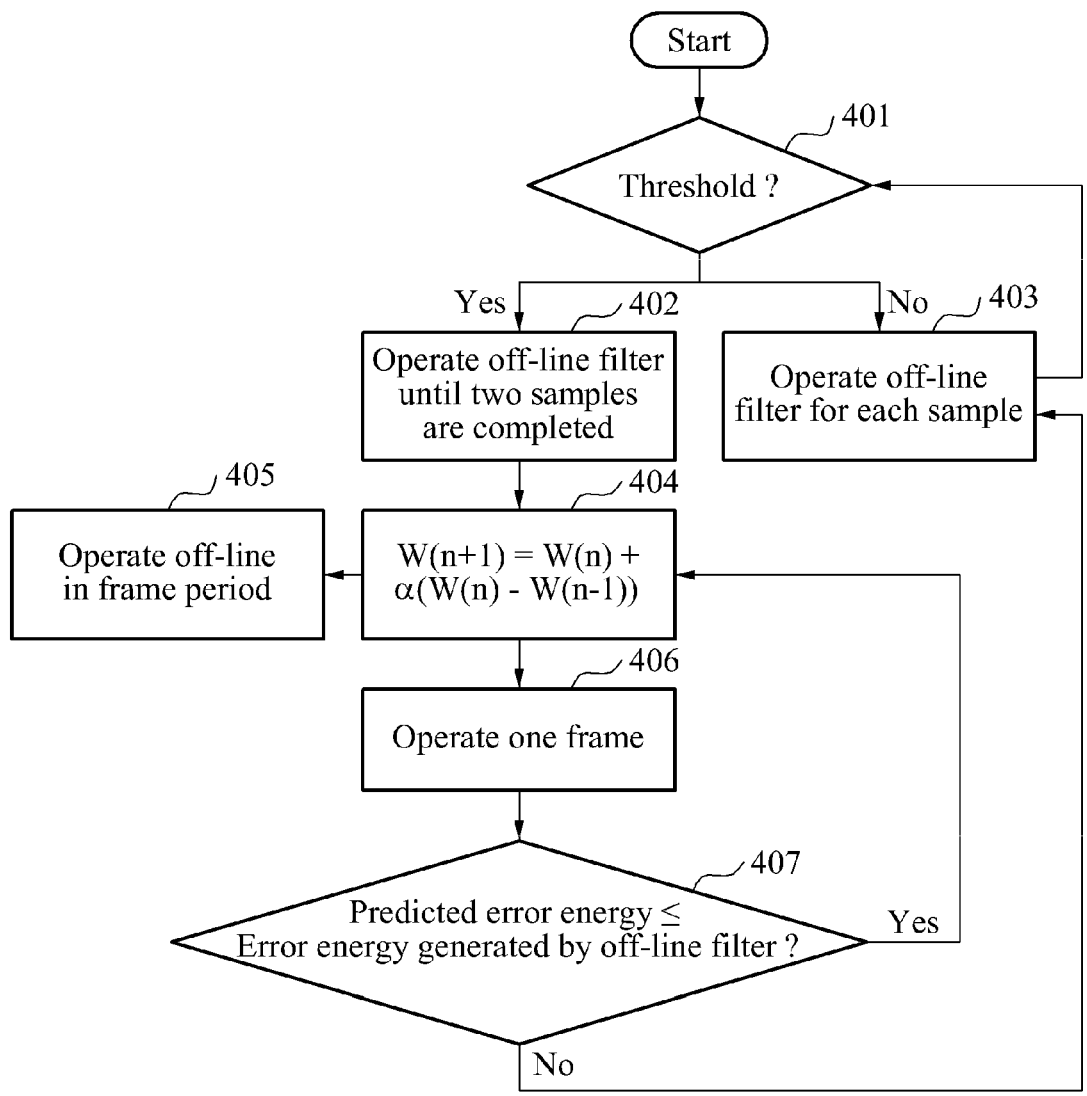

FIGS. 2 through 4 are flowcharts illustrating a wideband acoustic echo cancellation method according to an embodiment of the present invention.

Referring to FIG. 2, in operation 201, an adaptive filter may be operated using 128 tabs, and a sub-band adaptive filter may be operated using '128 tabs*3'.

In operation 202, whether a performance index for the adaptive filter is equal to or greater than a performance threshold may be determined.

When the performance index is determined to be less than the performance threshold, the wideband acoustic echo cancellation method may revert to operation 201.

Conversely, when the performance index is determined to be equal to or greater than the performance threshold, i may be set to '0' in operation 203, and a coefficient value and a position of a (3−i)-th sub-band adaptive filter may be stored in operation 204.

For example, when i is set to '0', a coefficient value and a position of a third sub-band adaptive filter may be stored in operation 204.

In operation 205, the (3−i)-th sub-band adaptive filter may be disabled.

For example, when the adaptive filter reaches a convergence, and when a result of an operation of three found intervals does not significantly affect a ratio of a near-end signal energy to an error signal energy, a corresponding adaptive filter coefficient may be stored in an internal memory, and an operation of each adaptive filter may be disabled.

In operation 206, the adaptive filter may be operated using 128 tabs, and the sub-band adaptive filter may be operated using '128 tabs*(3−(i+1))'.

When a condition of "performance index≥performance threshold±margin" is not met in operation 207, the (3−i)-th sub-band adaptive filter may be enabled, and the position and the coefficient value may be loaded in operation 208.

In operation 209, whether i is set to '0' may be determined. When i is not set to '0', the wideband acoustic echo cancellation method may revert to operation 206. When i is set to '0', the wideband acoustic echo cancellation method may revert to operation 201.

When the condition of "performance index≥performance threshold ±margin" is met in operation 207, a length of a current tail may be calculated using Equation 1 below in operation 210.

Length of current tail=Length of previous tail−(2048−(3−$i$)-th position value)　　　[Equation 1]

In the wideband acoustic echo cancellation method, a valid transfer function coefficient of an adaptive echo cancellation filter may be periodically adjusted, and a change in a system state may be tracked. In other words, in the wideband acoustic echo cancellation method, a filtering coefficient may be updated periodically, instead of continuously, and a soft and fuzzy logic determination may be performed on a size of an update gain, and accordingly an adaptation and a speed of a system may be optimized without sacrificing a stability.

Referring to FIG. 3, in operation 301, whether an initial operation is performed may be determined. When the initial operation is determined to be performed, a system may be initialized using a previous operation value in operation 302. Conversely, when the initial operation is determined not to be performed, the system may be initialized using a designated value in operation 303.

In operation 304, a wideband acoustic echo cancellation apparatus according to an embodiment of the present invention may be operated.

In operation 305, a ratio of a NET energy to an error energy may be calculated using the wideband acoustic echo cancellation apparatus, and the ratio may be compared with a monitoring coefficient.

In operation 306, whether the monitoring coefficient is greater than an initialization threshold may be determined. When the monitoring coefficient is determined to be greater than the initialization threshold, an initialization count value may be incremented by '1' in operation 307.

Subsequently, when the monitoring coefficient is determined to be equal to or less than the initialization threshold, the initialization count value may be set to '0' in operation 308.

In operation 309, whether the initialization count value is equal to or greater than 40 (2.5 sec) may be determined.

When the initialization count value is determined to be equal to or greater than 40 (2.5 sec), the wideband acoustic echo cancellation method may revert to operation 304, and an operation of the wideband acoustic echo cancellation apparatus may be reperformed. When initialization count value is determined to be less than 40 (2.5 sec), the wideband acoustic echo cancellation method may revert to operation 303, and the system may be initialized using the designated value.

Referring to FIG. 4, in operation 401, whether a threshold exists may be determined, and the threshold may be set to control an operation of an off-line filter.

When the threshold is determined to exist in operation 401, the off-line filter may be operated until two samples are completed in operation 402. Conversely, when the threshold is determined not to exist in operation 401, the off-line filter may be operated for each sample in operation 403.

When the off-line filter is operated until two samples are completed, an operation of '$W(n+1)=W(n)+\alpha(W(n)-W(n-1))$' may be performed in operation 404.

Subsequently, the off-line filter may be controlled to be operated in a frame period in operation 405, and one frame may be controlled to be operated in operation 406.

In operation 407, whether a predicted error energy is equal to or less than an error energy generated by the off-line filter may be determined.

When the predicted error energy is determined to be equal to or less than the error energy generated by the off-line filter, the wideband acoustic echo cancellation method may revert to operation 404. When the predicted error energy is determined to be greater than the error energy generated by the off-line filter, the wideband acoustic echo cancellation method may revert to operation 403.

The above-described embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A wideband acoustic echo cancellation apparatus, comprising:
 a delay length calculating unit to calculate a delay length of an echo path, using a near-end signal and a far-end signal;

an adaptive filter implementing unit to implement an adaptive filter based on the calculated delay length, using selected coefficients; and an error calculating unit to search for three intervals having a largest impulse response value from all intervals of a tail of the adaptive filter, and to calculate an error during an interval in which the selected coefficients are used.

2. The wideband acoustic echo cancellation apparatus of claim 1, further comprising:

a monitoring module to estimate a condition to change a length of the tail; and an adaptive filter controller to change the length of the tail, based on the estimated condition.

3. The wideband acoustic echo cancellation apparatus of claim 1, wherein, when the adaptive filter reaches a convergence, the adaptive filter controller verifies an influence of a result of an operation of the three intervals on a ratio of an energy of the near-end signal and a signal energy of the error, and when the verified influence is equal to or less than a threshold, the adaptive filter controller stores a corresponding adaptive filter coefficient in an internal memory, and disables an operation of the adaptive filter.

4. The wideband acoustic echo cancellation apparatus of claim 1, wherein a number of the selected coefficients is 128.

5. The wideband acoustic echo cancellation apparatus of claim 1, further comprising:

an adaptive filter controller to determine whether a length of a reference far-end signal that is currently used is equal to or less than a length of a tail that is set initially, based on position information of the adaptive filter.

6. The wideband acoustic echo cancellation apparatus of claim 5, wherein, when the length of the reference far-end signal is equal to or less than the length of the tail, the adaptive filter controller determines the length of the tail to be a sum of a delay time, an adaptive filter coefficient, a position of a used sub-band, and a filter coefficient of the sub-band.

7. A wideband acoustic echo cancellation method, comprising:

calculating a delay length of an echo path, using a near-end signal and a far-end signal;

implementing an adaptive filter based on the calculated delay length, using selected coefficients;

searching for three intervals having a largest impulse response value from all intervals of a tail of the adaptive filter;

calculating an error in the three intervals during an interval in which the selected coefficients are used;

verifying an influence of a result of an operation of the three intervals on a ratio of an energy of the near-end signal and a signal energy of the error, when the adaptive filter reaches a convergence;

storing a corresponding adaptive filter coefficient in an internal memory, and disabling an operation of the adaptive filter, when the verified influence is equal to or less than a threshold; and estimating a condition to change a length of the tail, and changing the length of the tail, based on the estimated condition.

8. The wideband acoustic echo cancellation method of claim 7, further comprising:

determining whether a length of a reference far-end signal that is currently used is equal to or less than a length of a tail that is set initially, based on position information of the adaptive filter.

9. The wideband acoustic echo cancellation method of claim 8, further comprising:

determining the length of the tail to be a sum of a delay time, an adaptive filter coefficient, a position of a used sub-band, and a filter coefficient of the sub-band, when the length of the reference far-end signal is equal to or less than the length of the tail.

10. A non-transitory computer readable recording medium storing a program to cause a computer to implement the method of claim 7.

* * * * *